(12) United States Patent
Choi et al.

(10) Patent No.: US 7,140,866 B2
(45) Date of Patent: Nov. 28, 2006

(54) SELF-ALIGNMENT STAGE FOR COMPRESSION-FORMING MACHINES

(75) Inventors: Kee-Bong Choi, Daejeon (KR); Jae-Jong Lee, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 440 days.

(21) Appl. No.: 10/793,128

(22) Filed: Mar. 4, 2004

(65) Prior Publication Data

US 2005/0048153 A1 Mar. 3, 2005

(30) Foreign Application Priority Data

Aug. 29, 2003 (KR) .................... 10-2003-0060342

(51) Int. Cl.
*B29C 43/04* (2006.01)
(52) U.S. Cl. .................... 425/352; 425/408; 425/418; 425/440
(58) Field of Classification Search ........ 425/352–355, 425/408, 410, 411–418, 435, 440
See application file for complete search history.

(56) References Cited

U.S. PATENT DOCUMENTS 5,370,517 A * 12/1994 Casati et al. ............... 425/116
5,769,297 A * 6/1998 Loomis et al. ............ 225/96.5
6,184,063 B1 * 2/2001 McKenna et al. .......... 438/113

* cited by examiner

*Primary Examiner*—Yogendra N. Gupta
*Assistant Examiner*—Thu Khanh T. Nguyen
(74) *Attorney, Agent, or Firm*—Reed Smith LLP

(57) ABSTRACT

A self-alignment stage for compression-forming machines, which self-aligns an upper surface of a lower mold seated on an inner frame, thus compensating for a relative pose error of the lower mold with respect to an upper mold when the material is compression-formed between the upper mold and the lower mold. The self-alignment stage for the compression-forming machines, includes an outer frame comprising a body having a space therein, a plurality of outer connectors protruding from a side surface of the body of the outer frame so as to support the body on a support base of a compression-forming machine, and the inner frame placed in the space of the outer frame such that the inner frame executes a horizontal translational motion and a rotational motion with respect to the outer frame. The self-alignment stage further includes a plurality of inner connectors to connect the inner frame to the outer frame while allowing the inner frame to execute the horizontal translational motion and the rotational motion with respect to the outer frame. The lower mold is seated on the inner frame is self-aligned by elasticity of the inner and outer connectors, so that the upper surface of the lower mold is in parallel surface contact with a lower surface of the upper mold when the material is compression-formed by the upper mold.

8 Claims, 9 Drawing Sheets

SELF-ALIGNMENT STAGE FOR COMPRESSION-FORMING MACHINES

CROSS-REFERENCE TO RELATED APPLICATIONS

This application claims priority of Korean Application No. 10-2003-0060342, filed Aug. 29, 2003, the complete disclosure of which is hereby incorporated by reference.

BACKGROUND OF THE INVENTION a) Field of the Invention

The present invention relates, in general, to compression-forming machines and, more particularly, to a self-alignment stage for the compression-forming machines which compensates for a relative pose error of a lower mold with respect to an upper mold when a material is compression-formed between the upper mold and the lower mold of the stage and, particularly, self-aligns a wafer on a vacuum chuck, in which the wafer and the vacuum chuck are corresponding to the lower mold, seated on the stage to compensate for a relative pose error with respect to a template corresponding to the upper mold when compression-forming a desired pattern with a material on the wafer, so that an upper surface of the wafer is in parallel surface contact with a lower surface of the template, thus reducing the number of defective products.

b) Description of the Related Art

Generally, compression-forming machines include a lower mold, and an upper mold which is placed above the lower mold and executes vertical directional motions above the lower mold, so that a material seated on the lower mold is compression-formed by the upper mold.

A variety of materials may be compression-formed by the above-mentioned compression-forming machines and, particularly, integrated circuits, which are used in semiconductor manufacturing processes, may be compression-formed on silicon wafers by the compression-forming machines.

Particularly, large scale integrated circuit patterns are formed on the silicon wafers by the compression-forming machines. The large scale integrated circuit patterns force the compression-forming machines to have reduced allowable errors, because the large scale integrated circuit patterns must be precisely formed.

FIGS. 1A and 1B are views showing a conventional compression-forming machine. The above conventional compression-forming machine includes a stage 1, and a vacuum chuck 2 which is placed on the stage 1. The compression-forming machine further includes a template 4 which is an upper mold to vertically move above a lower mold. A wafer 3 is placed on the vacuum chuck 2, in which the vacuum chuck 2 and the wafer 3 are corresponding to the lower mold.

As shown in FIG. 1A, a material M, for example, a photoresist solution is dispensed on the wafer 3 in the compression-forming machine. Thereafter, the material M is compressed by the template 4, then patterns on the template 4 are formed to the material M on the water 3, as shown in FIG. 1B.

During the above-mentioned compression-forming process, an upper surface of the water 3 must be in parallel surface contact with a lower surface of the template 4 to uniformly compress the material M. However, the conventional compression-forming machine is disadvantageous in that an assembling process, in which the elements of the machine are assembled such that the lower surface of the template 4 is in parallel surface contact with the upper surface of the wafer 3, is very difficult, because the template 4 only moves vertically by an actuator.

Furthermore, the conventional compression-forming machine must be equipped with various parts, such as sensors and actuators, so as to allow the upper surface of the wafer 3 to be in parallel surface contact with the lower surface of the template 4. Therefore, the conventional compression-forming machine is problematic in that its structure is complex, and its size and volume increase.

OBJECT AND SUMMARY OF THE INVENTION

Accordingly, the present invention has been made keeping in mind the above problems occurring in the prior art, and an object of the present invention is to provide a self-alignment stage for compression-forming machines which compensates for a relative pose error of a lower mold with respect to an upper mold when a material is compression-formed between the upper mold and the lower mold of the stage, as a mechanical nano-lithography system used in semiconductor processing equipments and, particularly, self-aligns a wafer on a vacuum chuck seated on the stage to compensate for a relative pose error with respect to a template corresponding to the upper mold when compression-forming a desired pattern with a material, for example a photoresist solution, on the wafer, so that an upper surface of the wafer is in parallel surface contact with a lower surface of the template, thus reducing the number of defective products.

Additional aspects and/or advantages of the invention will be set forth in part in the description which follows and, in part, will be obvious from the description, or may be learned by practice of the invention.

The above and/or other aspects are achieved by providing a self-alignment stage for compression-forming machines, including an outer frame comprising a body having a space therein, a plurality of outer connectors protruding from a side surface of the body of the outer frame so as to support the body on a support base of a compression-forming machine, and an inner frame placed in the space of the outer frame such that the inner frame executes a horizontal translational motion and a rotational motion with respect to the outer frame. The self-alignment stage further includes a plurality of inner connectors to connect the inner frame to the outer frame while allowing the inner frame to execute the horizontal translational motion and the rotational motion. An upper surface of a lower mold which is seated on the inner frame is self-aligned by the elasticity of the inner and outer connectors, so that the upper surface of the lower mold is in parallel surface contact with a lower surface of the upper mold when the material is compression-formed by the upper mold.

BRIEF DESCRIPTION OF THE DRAWINGS

The above and other objects, features and other advantages of the present invention will be more clearly understood from the following detailed description when taken in conjunction with the accompanying drawings, in which:

FIGS. 1A and 1B are views showing a conventional compression-forming machine, wherein:

FIG. FIG. 1A is a sectional view of the compression-forming machine in which an upper mold is spaced apart from a material seated on a lower mold, prior to compression-forming the material by the upper mold; and FIG. 1B is a sectional view of the compression-forming machine in which the upper mold is inclined while the material is compression-formed by the upper mold;

FIGS. 9A and 9B are sectional views of the self-alignment stage for compression-forming machines, according to the present invention, wherein:

FIG. 9A is a sectional view of the self-alignment stage of the present invention, in which an upper mold is spaced apart from a material seated on the inner frame, prior to compression-forming the material by the upper mold; and FIG. 9B is a sectional view showing an operational state of the self-alignment stage of the present invention, in which an upper surface of a lower mold seated on the inner frame is self-aligned to be in parallel surface contact with a lower surface of the upper mold when the upper mold is inclined while the material is compression-formed by the upper mold.

DESCRIPTION OF THE PREFERRED EMBODIMENTS

Figure 1A:
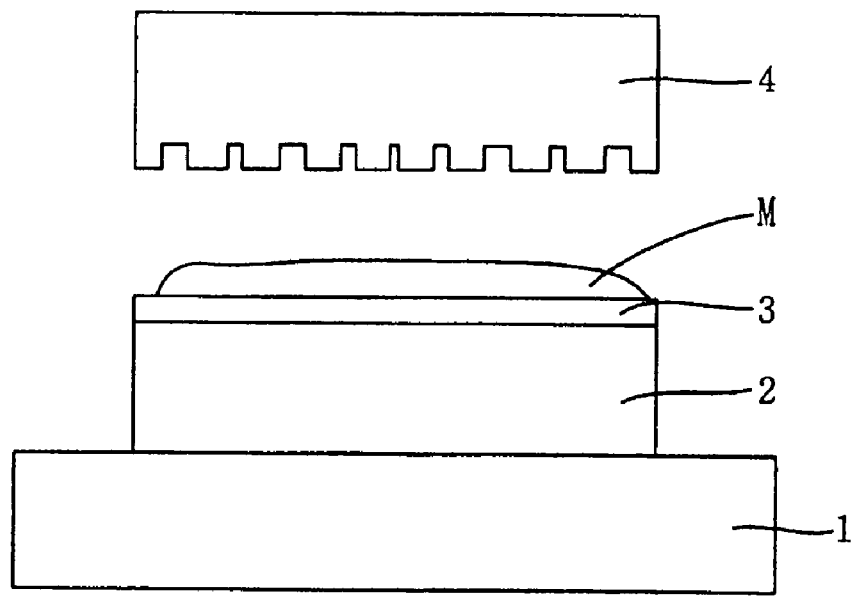
Figure 1B:
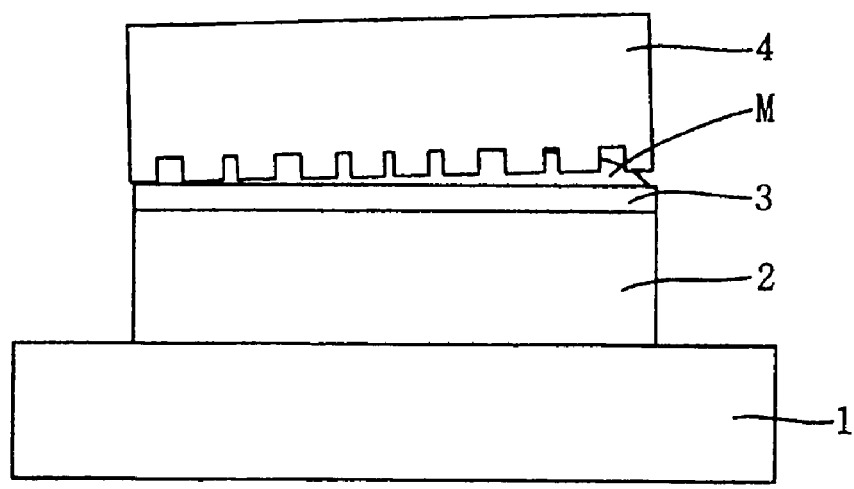

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
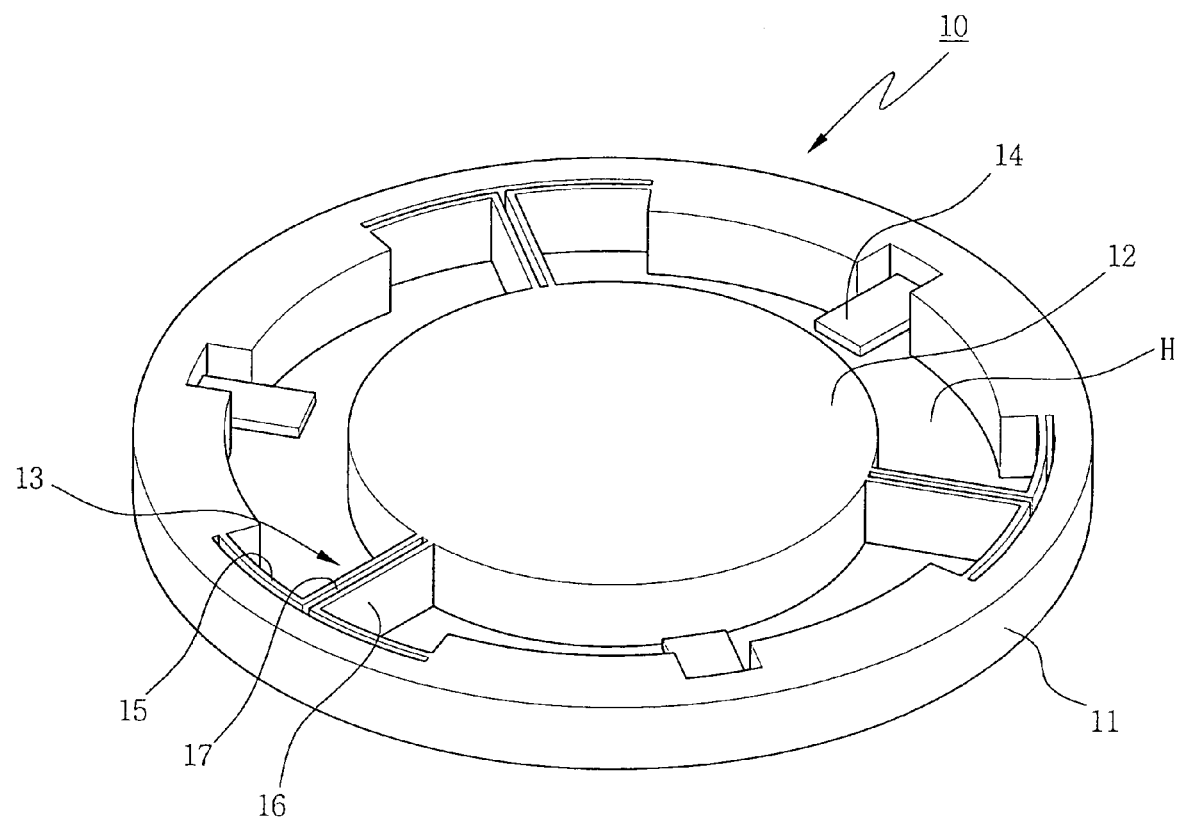
FIG. 2 is a perspective view of a self-alignment stage for compression-forming machines, according to a first embodiment of the present invention.
Figure 3:
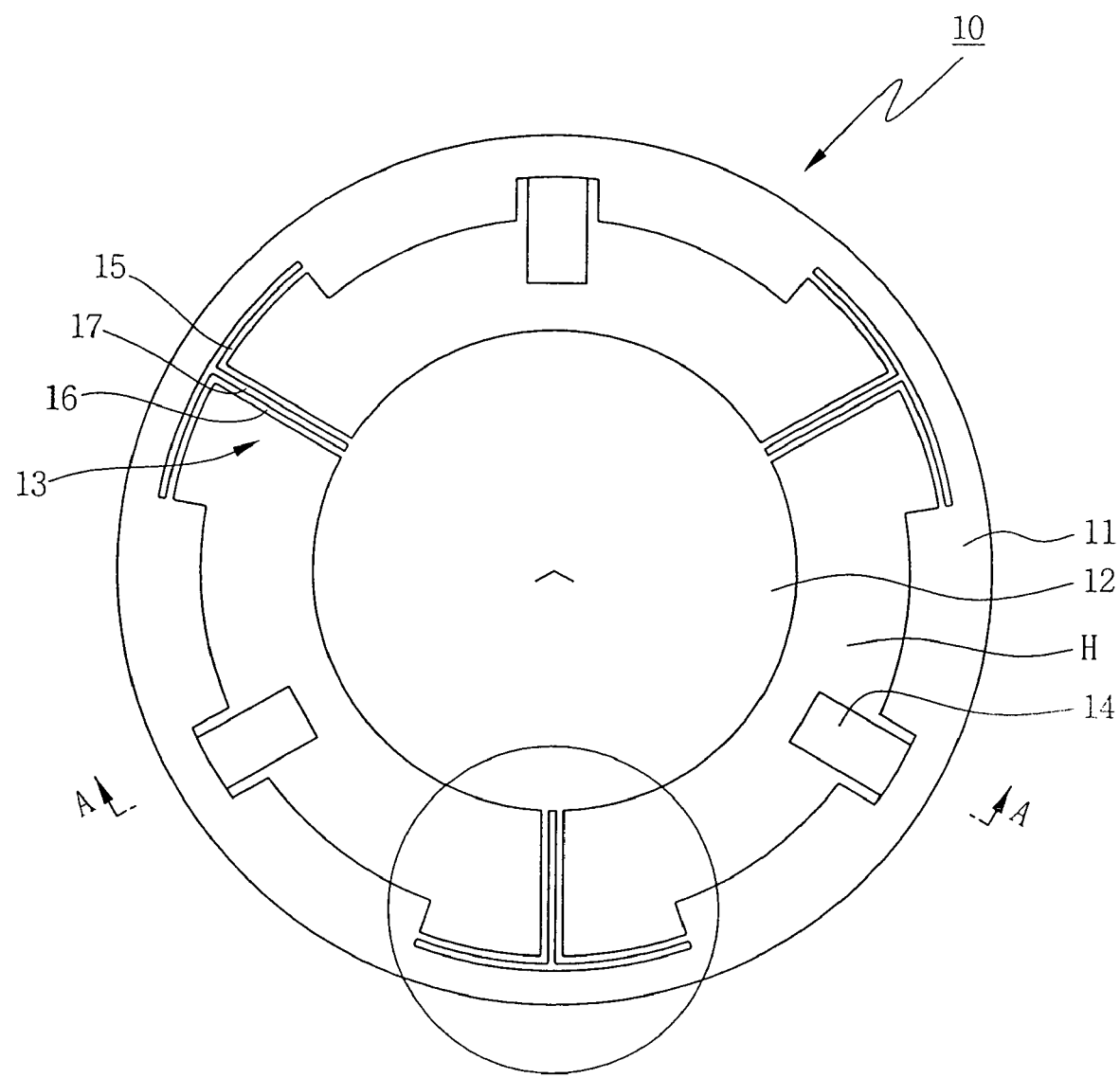
FIG. 3 is a top view of the self-alignment stage of FIG. 2.

FIG. 2 is a perspective view of a self-alignment stage 10 for compression-forming machines, according to a first embodiment of the present invention. FIG. 3 is a top view of the self-alignment stage of FIG. 2.

As shown in FIGS. 2 and 3, the self-alignment stage 10 for the compression-forming machines of the present invention includes an outer frame 11 which is supported by a plurality of outer connectors 14 on a support base of a compression-forming machine to execute an out-of-motion which has a wobbling motion of two degrees of freedom and a vertical translational motion of one degree of freedom. The self-alignment stage 10 further includes an inner frame 12 which is placed in the space H of the outer frame 11 such that the inner frame 12 executes an in-plane motion with respect to the outer frame 11, in which the in-plane motion means a horizontal translational motion of two degrees of freedom and a rotational motion of one degree of freedom. The inner frame 12 seats a vacuum chuck 2 and a wafer 3 thereon. The self-alignment stage 10 further includes a plurality of inner connectors 13 to connect the inner frame 11 to the outer frame 12 while allowing the inner frame 11 to execute the horizontal translational motion of two degrees of freedom and the rotational motion of one degree of freedom.

In the self-alignment stage 10 which has the above-mentioned construction, the inner frame 12 executes six degrees of freedom in the space H, because the outer frame 11 executes the wobbling motion of two degrees of freedom and the vertical translational motion of one degree of freedom, and the inner frame 12 executes the horizontal translational motion of two degrees of freedom and the rotational motion of one degree of freedom with respect to the outer frame while compression-forming a material M by a template 4 of an upper mold of the compression-forming machine. Therefore, the wafer 3 on the vacuum chuck 2 seated on the inner frame 12 is self-aligned to compensate for a relative pose error of the template 4 with respect to the wafer 3, such that an upper surface of the wafer 3 is in parallel surface contact with a lower surface of the template 4 of the compression-forming machine, so that the self-alignment stage 10 evenly forms patterns on the wafer 3.

The outer frame 11 is a ring-shaped frame, and forms the space H therein to place the inner frame 12 in the space H. The plurality of outer connectors 14 are protruded from side surfaces of the outer frame 11 so as to support the outer frame 11 on the support base. At this time, the outer connectors 14 are preferably protruded from an inside surface of the outer frame 11 for convenience in use and handling the self-alignment stage 10.

The number of outer connectors 14, which are protruded from the inside surface of the outer frame 11 so as to support the self-alignment stage 10 on the support base B which is placed at a predetermined height from a support surface, is not strictly limited in the present invention. However, in the embodiment, the outer connectors 14 preferably comprise three outer connectors 14 which are protruded inward from the inside surface of the outer frame 11 at the same angular intervals in radial directions.

As shown in FIGS. 2 and 3, each of the outer connectors 14 comprises a thin plate-type connector which has a predetermined width and a predetermined elasticity. Due to the above-mentioned outer connectors 14 which has the predetermined elasticity, the outer frame 11, the inner frame 12 and the inner connectors 13 which connect the inner frame 12 to the outer frame 11, simultaneously execute the vertical translational motion and the wobbling motion which are so called the out-of-motion.

The inner frame 12 seats thereon a lower mold, and comprises a disk-shaped type frame. The inner frame preferably has the same thickness as the outer frame 11. An upper surface of the inner frame 12 has a desired shape according to the shape of a lower surface of the lower mold. In the accompanying drawings of the present invention, the inner frame 12 comprises a flat-surface frame.

The inner frame 12 is connected to the outer frame 11 by the inner connectors 13. The wafer 3 on the vacuum chuck 2 held on the inner frame 12 is self-aligned by the elasticity of the inner and outer connectors 13 and 14 when compression-forming the material M, so that the upper surface of the wafer 3 held on the inner frame 12 is in parallel surface contact with the lower surface of the template 4 of the upper mold of the compression-forming machine.

In a brief description, the inner frame 12 is integrally connected to the outer frame 11 by the inner connectors 13, so that the inner frame 12 executes the vertical translational motion and the wobbling motion with the outer frame 12 and, simultaneously, further has an additional compensational function by the elasticity of the inner connectors 13.

That is, the inner frame 12 executes the horizontal translational motion and the rotational motion with respect to the outer frame 11, which are the so-called in-plane motion, on the plane defined by the outer frame 11.

The inner connectors 13, which connect the inner frame 12 to the outer frame 11, each include a pair of elastic circumferential parts 15 which have a thin plate shape and circumferentially extend in parallel to the inside surface of the outer frame 11, with outside ends of the circumferential parts 15 being connected to the outer frame 11. Each of the inner connectors 13 further includes a pair of elastic radial parts 16, of which the outside ends are respectively perpendicularly integrated with inside ends of the circumferential parts 15, and the inside ends are connected to the inner frame 12.

Figure 4:
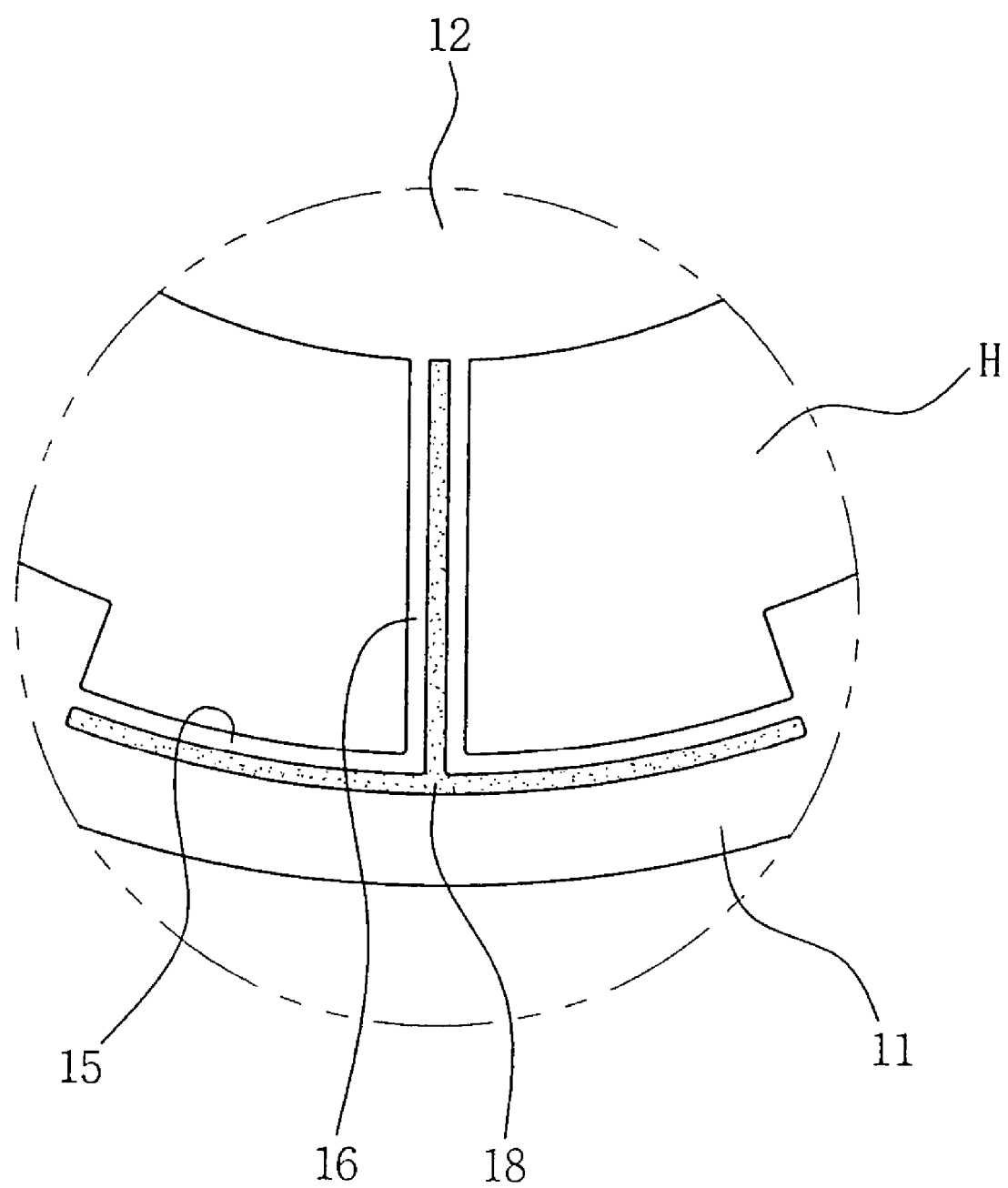
FIG. 4 is a partially enlarged view of an inner connector shown by an encircled portion of FIG. 3.

As shown in FIG. 4, due to the above-mentioned construction of the inner connectors 13, the integrated body of each of the circumferential parts 15 and each of the radial parts 16 defines an L-shaped appearance. The whole shape of each of the inner connectors 13 defines a T-shaped appearance in which two L-shaped bodies are arranged to be symmetric to each other.

Figure 6:
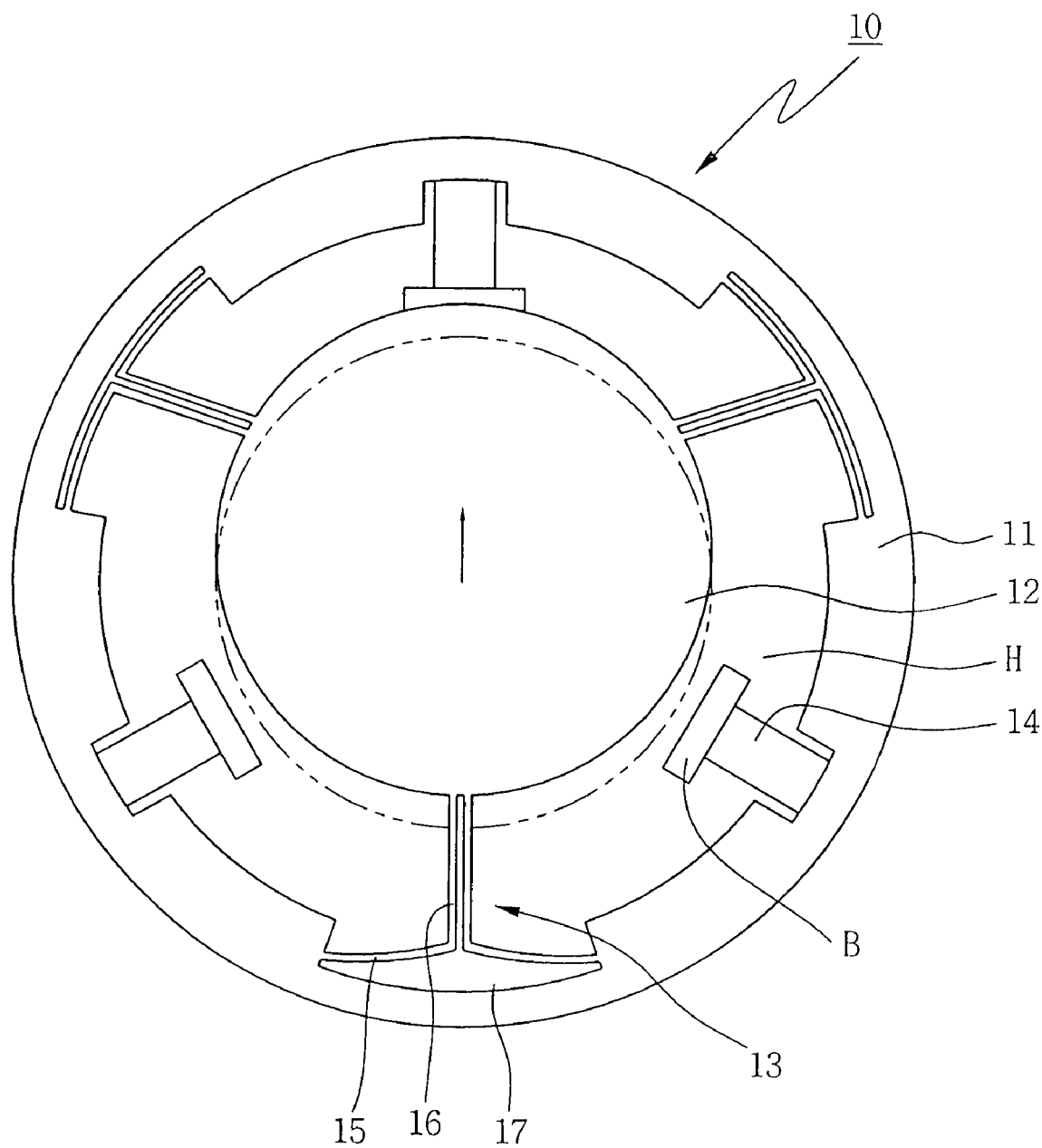
FIG. 6 is a top view of the self-alignment stage of FIG. 2, in which a position of an inner frame is self-aligned by a horizontal translational motion of the inner frame.
Figure 7:
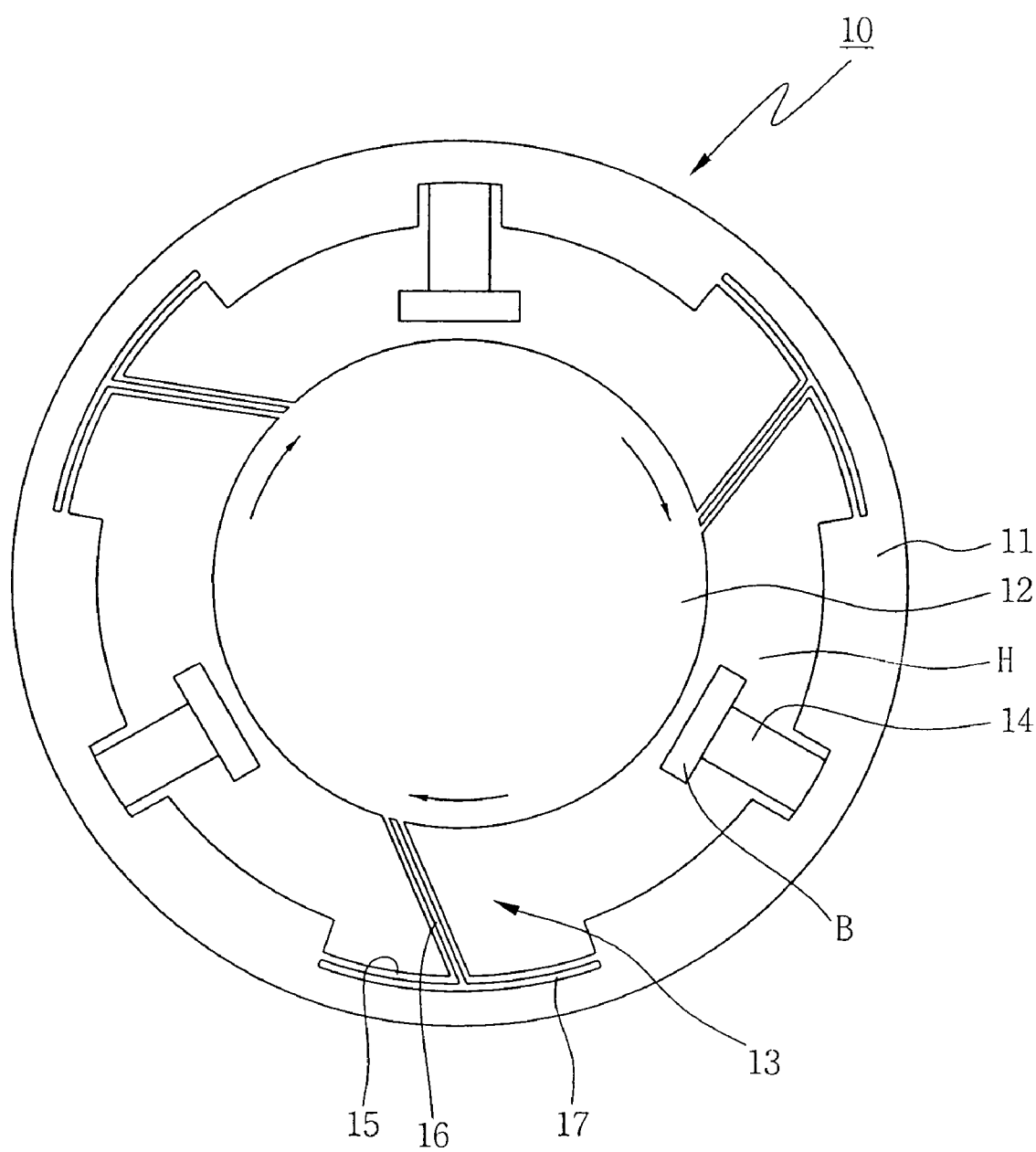
FIG. 7 is a top view of the self-alignment stage of FIG. 2, in which the inner frame is self-aligned by a rotational motion of the inner frame.
Figure 8:
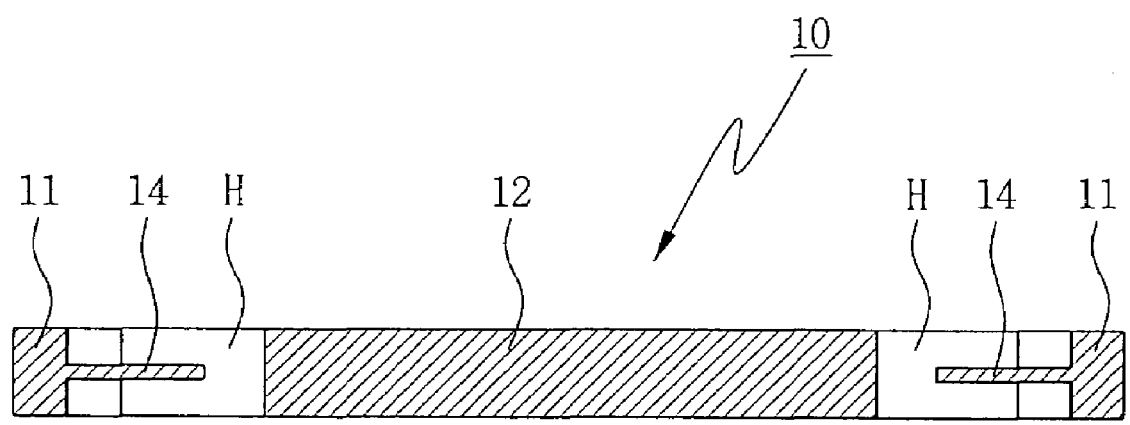
FIG. 8 is a sectional view taken along the line A—A of FIG. 3, in which an internal construction of the self-alignment stage of FIG. 2 is shown.

Each of the inner connectors 13 comprises a thin plate-type connector which has a predetermined height and a predetermined elasticity. The height of each of the inner connectors 13 is preferably equal to the thickness of the outer frame 11. Such inner connectors 13 respectively have slots 17 therein. The inner frame 12 is self-aligned by the inner connectors 13 having the slots 17 in desired directions on the plane defined by the outer frame 11, as shown in FIGS. 6 and 7.

In the above-mentioned construction of the self-alignment stage 10 of the present invention, the wafer 3 on the vacuum chuck 2 seated on the self-alignment stage 10 must be self-aligned, according to the obliquities of the template 4 of the compression-forming machine, so that the self-alignment stage 10 is made of an elastic material, such as, a high elastic metal and, preferably, aluminum.

Therefore, the self-alignment stage 10 of the present invention, in which the outer frame 11, the inner frame 12, the inner connectors 13 and the outer connectors 14 are integrated with each other into a single structure, is preferably made of aluminum.

As shown in FIG. 4, each of the inner connectors 13 of the self-alignment stage 10 has the slot 17 therein, with a damping unit 18 filling the slot 17 to absorb energy of the elastic deformation of the inner connector 13. Therefore, the damping units 18 in the slots 17 rapidly reduce residual vibrations of the inner connectors 13 after the patterns are formed on the wafer 3 by use of the self-alignment stage 10 of the present invention.

Figure 5:
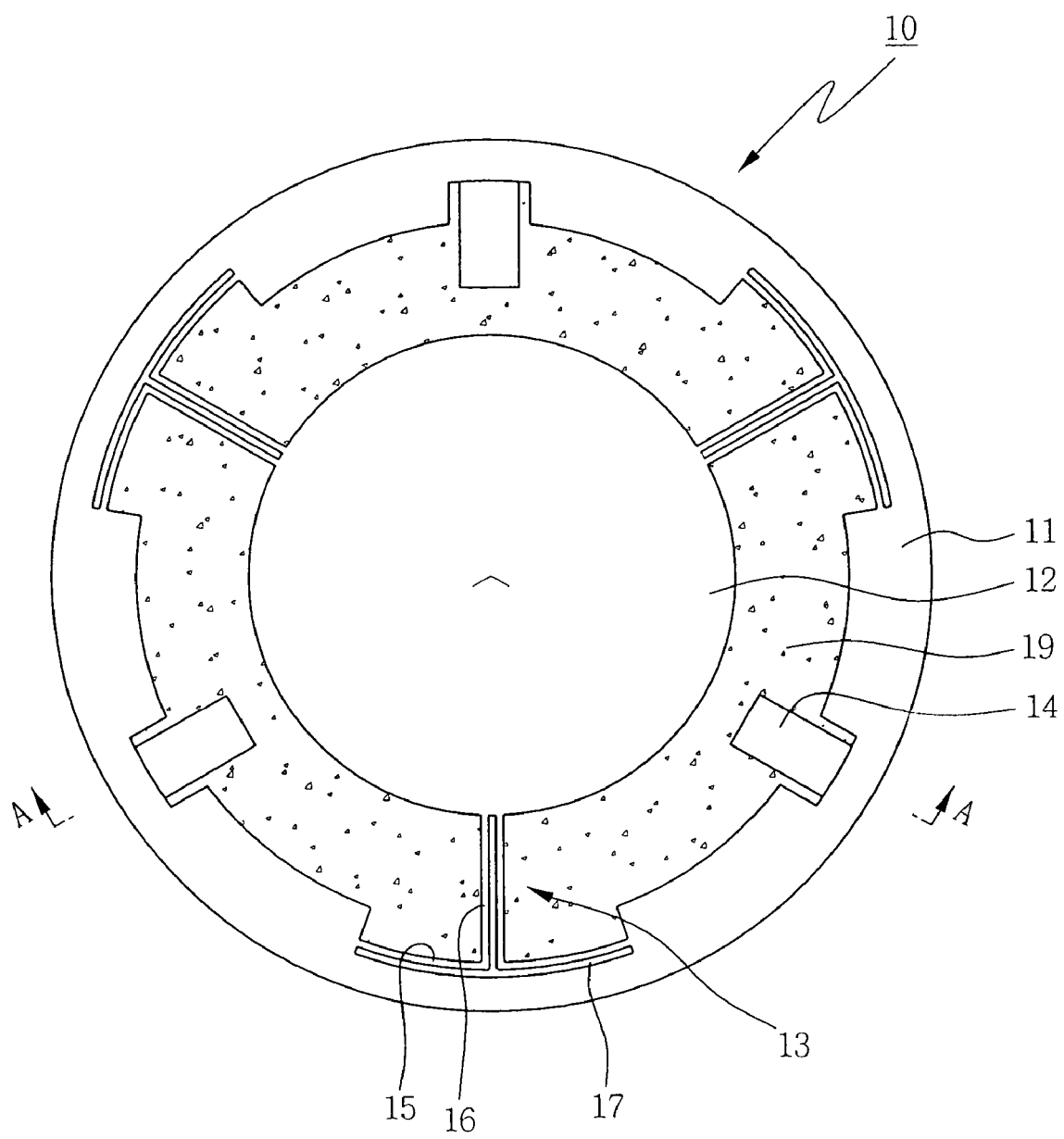
FIG. 5 is a top view of a self-alignment stage for compression-forming machines, in which three absorbing units are respectively provided between an outer frame and an inner frame, according to a second embodiment of the present invention.

FIG. 5 is a top view of a self-alignment stage 10 for compression-forming machines, in which three absorbing units 19 are respectively provided between the outer frame 11 and the inner frame 12, according to a second embodiment of the present invention.

As shown in FIG. 5, the three absorbing units 19 may be respectively provided in the space H between the outer frame 11 and the inner frame 12, so as to absorb residual vibrations of the inner frame 12 and the inner connectors 13 after patterns are formed on a wafer 3 by use of the self-alignment stage 10 according to the second embodiment of the present invention.

Next, the operation of the self-alignment stage 10 of the present invention, in which the wafer 3 on the vacuum chuck 2 seated on the inner frame 12 is self-aligned according to the obliquities of the template 4 while forming patterns on the wafer 3 by the template 4, so that the upper surface of the wafer 3 is in parallel surface contact with the lower surface of the template 4, will be described herein below.

The self-alignment stage 10 of the present invention has the outer frame 11, the inner frame 12 which is placed in the space of outer frame 11, the plurality of inner connectors 13 which are provided between the outer frame 11 and the inner frame 12, and the plurality of outer connectors 14 radially extending inward from the inside surface of the outer frame 11. Particularly, each of the three outer connectors 14 of the outer frame 11 comprises the thin-plate type connector, with the predetermined width. The three inner connectors 13 each comprise the thin-plate type connector having the two L-shaped bodies, with the predetermined height.

In the self-alignment stage 10 having the above-mentioned construction, each of the outer connectors 14 is coupled to a side surface of the support base (B). Accordingly, the outer frame 11 executes the vertical translational motion, as well as the wobbling motion in which the outer frame 11 moves to be inclined at predetermined angles. The inner frame 12 is self-aligned by the same motions as the outer frame 11, because the inner frame 12 is connected to the outer frame 11 by the inner connectors 13, so that the upper surface of the wafer 3 on the vacuum chuck 2 seated on the inner frame 12 may be in parallel surface contact with the lower surface of the template 4.

In addition, the inner frame 12 is further self-aligned by the inner connectors 13. That is, the inner frame 12 executes the horizontal translational motion as shown in FIG. 6 and the rotational motion as shown in FIG. 7 on the plane defined in the outer frame 11.

Therefore, the inner frame 12, which seats thereon the vacuum chuck 2 with the wafer 3, executes the wobbling motion of two degrees of freedom and the vertical translational motion of one degree of freedom, with the outer frame 11 and, simultaneously, executes the horizontal translational motion of two degrees of freedom and the rotational motion of one degree of freedom with respect to the outer frame 11. Due to the above-mentioned motions of the inner frame 12, the wafer 3 on the vacuum chuck 2, which is seated on the inner frame 12, is self-aligned, so that the upper surface of the wafer 3 is in parallel surface contact with the lower surface of the template 4 of the compression-forming machine.

Figure 9A:
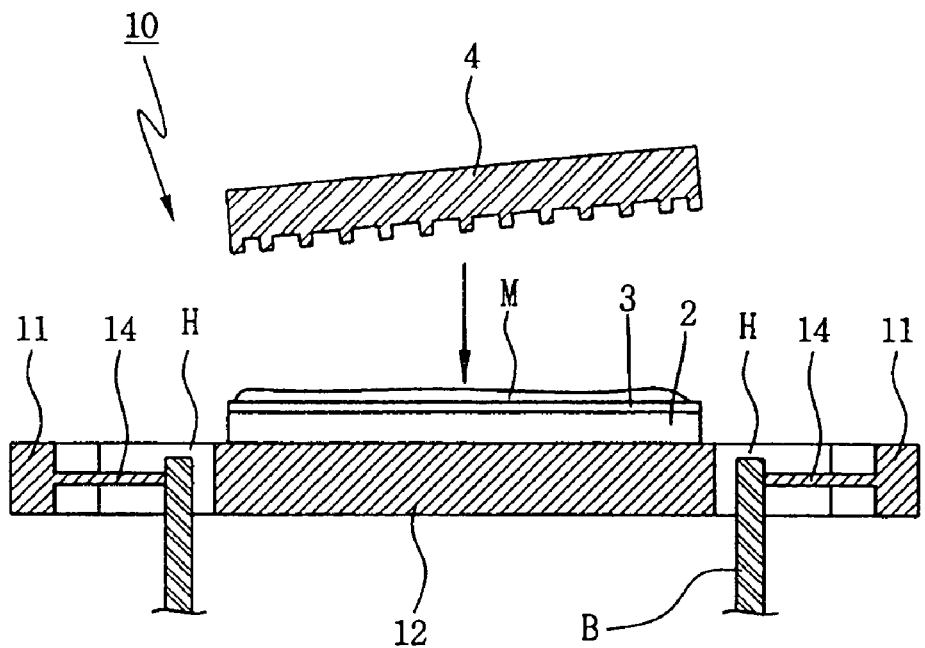
Figure 9B:
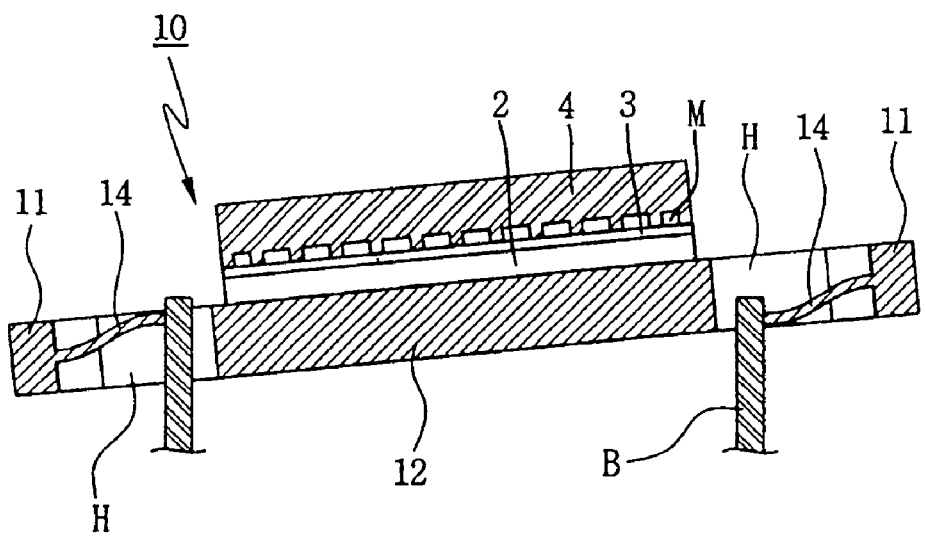

Even though the template 4 is inclined when the material M on the wafer 3 is compressed-formed by the template 4, as shown in FIG. 9A, the self-alignment stage 10 of the present invention is capable of evenly forming the pattern on the wafer 3, because the inner frame 12 of the self-alignment stage 10 is self-aligned, as described above.

As apparent from the above description, a self-alignment stage for compression-forming machines according to the present invention has a self-alignment type mechanism by a passive compliance of six degrees of freedom in which the self-alignment stage is passively self-aligned by an external force from a template applied to the wafer.

The self-alignment stage of the present invention having the above-mentioned mechanism reduces its allowable error caused in an element assembling process, in comparison with conventional compression-forming machines inventions. Furthermore, the self-alignment stage of the present invention is advantageous in that its structure is simplified while executing an out-of-motion and an in-plane motion, and a structural distortion caused by thermal deformation of the self-alignment stage reduces due to a symmetric structure.

In addition, the self-alignment stage of the present invention is advantageous in that a damping unit in each of the inner connectors rapidly reduces a residual vibration of the inner frame by absorbing the residual vibration of the inner frame when a material on a lower mold seated on the inner frame is compression-formed by an upper mold.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A self-alignment stage for compression-forming machines, comprising:
    an outer frame comprising a body having a space therein;
    a plurality of outer connectors protruding from a side surface of the body of the outer frame so as to support the body on a support base of a compression-forming machine;
    an inner frame placed in the space of the outer frame such that the inner frame executes a horizontal translational motion and a rotational motion; and
    a plurality of inner connectors to connect the inner frame to the outer frame while allowing the inner frame to execute the horizontal translational motion and the rotational motion on a plane with respect to the outer frame,
    whereby the material seated on a lower mold on the inner frame is self-aligned by elasticity of the inner and outer connectors, so that an upper surface of the lower mold is in parallel surface contact with a lower surface of an upper mold when the material is compression-formed by the upper mold.

2. The self-alignment stage as set forth in claim 1, wherein each of the outer connectors comprises a thin plate-type connector which integrally extends from an inside surface of the body of the outer frame and has a predetermined elasticity to allow for a rotational motion of the outer frame.

3. The self-alignment stage as set forth in claim 1, wherein the outer frame, the inner frame and the plurality of inner connectors are integrated with each other into a single structure.

4. The self-alignment stage as set forth in claim 1, wherein each of the inner connectors comprises:
    a pair of elastic circumferential parts having a thin plate shape and circumferentially extending in parallel to an inside surface of the outer frame, with outside ends of the circumferential parts being connected to the outer frame; and
    a pair of elastic radial parts connected at outside ends thereof to inside ends of the circumferential parts and connected at inside ends thereof to the inner frame,
    whereby the inner connectors are aligned between the outer connectors to connect the inner frame to the outer frame.

5. The self-alignment stage as set forth in claim 1, wherein the outer frame, the inner frame and the plurality of inner connectors are made of aluminum.

6. The self-alignment stage as set forth in claim 1, wherein each of the plurality of inner connectors has a same height as the outer frame.

7. The self-alignment stage as set forth in claim 1, wherein each of the plurality of inner connectors has a slot therein, with an elastic material filling the slot.

8. The self-alignment stage as set forth in claim 1, wherein the plurality of outer connectors comprise three connectors which extend inward from the outer frame in radial directions.

* * * * *